US012169888B2

(12) United States Patent
Hu et al.

(10) Patent No.: US 12,169,888 B2
(45) Date of Patent: Dec. 17, 2024

(54) FLOOR PLAN IMAGE GENERATING METHOD AND DEVICE, COMPUTER DEVICE AND STORAGE MEDIUM

(71) Applicant: SHENZHEN UNIVERSITY, Guangdong (CN)

(72) Inventors: Ruizhen Hu, Shenzhen (CN); Hui Huang, Shenzhen (CN); Hao Zhang, Shenzhen (CN); Zeyu Huang, Shenzhen (CN); Yuhan Tang, Shenzhen (CN)

(73) Assignee: Shenzhen University, Guangdong (CN)

( * ) Notice: Subject to any disclaimer, the term of this patent is extended or adjusted under 35 U.S.C. 154(b) by 277 days.

(21) Appl. No.: 17/885,317

(22) Filed: Aug. 10, 2022

(65) Prior Publication Data

US 2022/0383572 A1    Dec. 1, 2022

Related U.S. Application Data

(63) Continuation of application No. PCT/CN2020/111335, filed on Aug. 26, 2020.

(30) Foreign Application Priority Data

Apr. 3, 2020    (CN) .......................... 202010257143.6

(51) Int. Cl.
*G06T 11/60*    (2006.01)
*G06V 10/774*    (2022.01)
(Continued)

(52) U.S. Cl.
CPC ............ *G06T 11/60* (2013.01); *G06V 10/774* (2022.01); *G06V 10/778* (2022.01); *G06V 10/82* (2022.01);
(Continued)

(58) Field of Classification Search
CPC . G06T 11/60; G06T 2210/04; G06T 2210/12; G06T 11/203; G06T 11/206;
(Continued)

(56) References Cited

U.S. PATENT DOCUMENTS 10,460,064 B1    10/2019 Posser et al.
2013/0283190 A1*    10/2013 Wilson .................... G06F 30/13
                                                        715/753
(Continued)

FOREIGN PATENT DOCUMENTS

CN    103268621 A    8/2013
CN    106484959 A    3/2017
(Continued)

OTHER PUBLICATIONS

International Search Report dated Jan. 6, 2021 issued in corresponding Parent Application No. PCT/CN2020/111335 w/English Translation (5 pages).
(Continued)

*Primary Examiner* — Said Broome
*Assistant Examiner* — Donna J. Ricks
(74) *Attorney, Agent, or Firm* — Polsinelli PC

(57) ABSTRACT

A floor plan image generating methodology is provided. The methodology includes: acquiring a boundary of a target building and a layout constraint of the target building; outputting multiple first floor plan images according to the layout constraint of the target building; selecting multiple second floor plan images from the multiple first floor plan images; applying a layout constraint of each of the second floor plan images to the boundary of the target building, and obtaining a layout of the target building corresponding to each of the multiple second floor plan images; inputting the layout of the target building and the boundary of the target building into a floor plan image generating network; and
(Continued)

obtaining a predicted floor plan image of the target building outputted by the floor plan image generating network.

20 Claims, 10 Drawing Sheets

(51) Int. Cl.
*G06V 10/778* (2022.01)
*G06V 10/82* (2022.01)

(52) U.S. Cl.
CPC ...... *G06T 2210/04* (2013.01); *G06T 2210/12* (2013.01)

(58) Field of Classification Search
CPC .... G06V 10/774; G06V 10/778; G06V 10/82; G06V 10/454; G06N 3/08; G06F 30/12; G06F 30/13; G06F 30/27; G06F 2111/04
See application file for complete search history.

(56) References Cited

U.S. PATENT DOCUMENTS

| | | | |
|---|---|---|---|
| 2015/0279000 A1 | 10/2015 | Nakatsukasa et al. | |
| 2021/0073449 A1* | 3/2021 | Segev | G06F 30/27 |
| 2023/0086205 A1* | 3/2023 | Kweon | G06Q 10/101 |
| | | | 707/724 |

FOREIGN PATENT DOCUMENTS

| | | |
|---|---|---|
| CN | 107506391 A | 12/2017 |
| CN | 110633553 A | 12/2019 |

OTHER PUBLICATIONS

PCT/ISA/220 dated Jan. 6, 2021 issued in corresponding Parent Application No. PCT/CN2020/111335 (1 page).

PCT/ISA/237 Written Opinion of the International Searching Authority dated Jan. 6, 2021 issued in corresponding Parent Application No. PCT/CN2020/111335 w/English Translation (6 pages).

Chinese Office Action dated Mar. 1, 2021 issued in corresponding Patent Application No. 202010257143.6 (5 pages).

Hu et al., "Graph2Plan: Learning Floorplan Generation from Layout Graphs", ACM Trans. Graph, vol. 39, No. 4, Article 1. Publication date: Jul. 2020, 14 pages.

Wu et al., "MIQP-based Layout Design for Building Interiors", Computer Graphics Forum, 2018 The Eurographics Association and John Wiley & Sons Ltd., 11 pages.

* cited by examiner

FLOOR PLAN IMAGE GENERATING METHOD AND DEVICE, COMPUTER DEVICE AND STORAGE MEDIUM

CROSS-REFERENCE TO RELATED APPLICATION

This application is a continuation of international patent application No. PCT/CN2020/111335, filed on Aug. 26, 2020, which claims priority to Chinese Patent Application No. 202010257143.6, filed on Apr. 3, 2020 and entitled "FLOOR PLAN IMAGE GENERATING METHOD AND DEVICE, COMPUTER DEVICE AND STORAGE MEDIUM". The contents of the above identified applications are hereby incorporated herein in their entireties by reference.

TECHNICAL FIELD

The present application relates to the field of computer technology, and in particular, to a floor plan image generating method, a floor plan image generating device, a computer device, and a storage medium.

BACKGROUND

In daily life, a design for a building, such as a house type design for the building or a layout design for the building, is often required. Since a manual design is often time-consuming, an automatic floor plan image generating method has emerged.

In the related automatic floor plan image generating method, a boundary shape of the building is necessarily acquired first. Then a floor plan image, matched with the building boundary shape, is searched from a large number of pre-stored floor plan image data, and the searched floor plan image is output.

However, the related automatic floor plan image generating method may quickly generate a floor plan image, but quality of the generated floor plan image is not too high because the floor plan image is generated only by performing a simple search and match in a data set.

SUMMARY

In view of the above technical problems, it is necessary to provide a floor plan image generating method, a floor plan image generating device, a computer device, and a storage medium that can improve the quality of the floor plan image.

In a first aspect, a floor plan image generating method is provided, and the method includes: acquiring a boundary of a target building and a layout constraint of the target building, the layout constraint including room types, room quantities, room locations, and adjacency relations between rooms; outputting multiple first floor plan images according to the layout constraint of the target building; selecting multiple second floor plan images from the multiple first floor plan images, and a matching degree between a boundary of each of the multiple second floor plan images and the boundary of the target building satisfying a preset condition; for each of the second floor plan images, applying a layout constraint of each of the second floor plan images to the boundary of the target building, and obtaining a layout of the target building corresponding to each of the multiple second floor plan images; and for each layout of the target building, inputting the layout of the target building and the boundary of the target building into a floor plan image generating network, and obtaining a predicted floor plan image of the target building outputted by the floor plan image generating network, wherein the predicted floor plan image includes a room bounding box of each room in the target building and a positional relation of each room bounding box in the boundary of the target building.

In one of the embodiments, the outputting the multiple first floor plan images according to the layout constraint of the target building includes retrieving the multiple first floor plan images that satisfy the layout constraint of the target building from a pre-stored floor plan image data set.

In one of the embodiments, the selecting the multiple second floor plan images from the multiple first floor plan images, includes: obtaining turning functions of boundaries of the multiple first floor plan images and a turning function of the boundary of the target building; calculating an accumulated difference between each of the turning functions of the boundaries of the multiple first floor plan images and the turning function of the boundary of the target building; and using the multiple first floor plan images each corresponding to the accumulated difference smaller than a preset difference threshold as the multiple second floor plan images.

In one of the embodiments, for each of the second floor plan images, applying the layout constraint of each of the second floor plan images to the boundary of the target building, and obtaining the layout of the target building corresponding to each of the second multiple floor plan images, includes: adjusting each of the multiple second floor plan images until an angle between a front door direction of each of the multiple second floor plan images and a front door direction of the target building is smaller than a preset angle threshold, and obtaining adjusted second floor plan images; and for each of the adjusted second floor plan images, applying room types, room quantities, room locations, and adjacency relations between rooms of each of the adjusted second floor plan images to the boundary of the target building, and obtaining the layout of the target building corresponding to each of the multiple second floor plan images.

In one of the embodiments, the for each layout of the target building, inputting the layout of the target building and the boundary of the target building into the floor plan image generating network, and obtaining the predicted floor plan image of the target building outputted by the floor plan image generating network, includes: for each layout of the target building, inputting the layout of the target building into an image neural network, and obtaining a room feature vector corresponding to each room in the layout of the target building; inputting the boundary of the target building into a first convolutional neural network (CNN), and obtaining a boundary feature vector of the target building; correlating the room feature vector corresponding to each room with the boundary feature vector to obtain a correlated feature vector corresponding to each room; inputting the correlated feature vector corresponding to each room into a first multilayer perceptron (MLP), and obtaining an initial bounding box corresponding to each room in the layout of the target building; mapping the correlated feature vector corresponding to each room by using the initial bounding box corresponding to each room to obtain a first feature image corresponding to each room; combining multiple first feature images of multiple rooms to obtain a second feature image, and inputting the second feature image into a second CNN to obtain a grid floor plan image of the target building; and inputting multiple correlated feature vectors of the multiple rooms, multiple initial bounding boxes of the multiple rooms and the grid floor plan image into a bounding box optimizing network to obtain the predicted floor plan image of the target building, and the bounding box optimizing network comprising a third CNN, a pooled layer of a region of interest, and a second MLP.

In one of the embodiments, the method further includes: obtaining a training data set, and the training data set including multiple floor plan image data; training an initial floor plan image generating network by using the training data set to obtain trained floor plan image generating network; calculating a loss value of the trained floor plan image generating network by using a cross entropy loss function, a regression loss function, and a geometric loss function; and adjusting parameters of the trained floor plan image generating network according to the loss value to obtain the floor plan image generating network.

In one of the embodiments, the method further includes: aligning each room bounding box of the target building with the boundary of the target building; and aligning adjacent room bounding boxes of the target building.

In a second aspect, a floor plan image generating device is provided and includes a processor and a memory. The memory has computer programs stored therein, and the computer programs, when being executed by the processor, causes the processor to perform: acquiring a boundary of a target building and a layout constraint of the target building, the layout constraint comprising room types, room quantities, room locations, and adjacency relations between rooms; outputting multiple first floor plan images according to the layout constraint of the target building; selecting multiple second floor plan images from the multiple first floor plan images, and a matching degree between a boundary of each of the multiple second floor plan images and the boundary of the target building satisfying a preset condition; for each of the second floor plan images, applying a layout constraint of each of the second floor plan images to the boundary of the target building, and obtaining a layout of the target building corresponding to each of the multiple second floor plan images; and for each layout of the target building, inputting the layout of the target building and the boundary of the target building into a floor plan image generating network, and obtaining a predicted floor plan image of the target building outputted by the floor plan image generating network. The predicted floor plan image includes a room bounding box of each room in the target building and a positional relation of each room bounding box in the boundary of the target building.

In a third aspect, a computer device is provided, a memory and a processor. The memory stores computer programs, and the processor, when executing the computer programs, performs: acquiring a boundary of a target building and a layout constraint of the target building, the layout constraint comprising room types, room quantities, room locations, and adjacency relations between rooms; outputting multiple first floor plan images according to the layout constraint of the target building; selecting multiple second floor plan images from the multiple first floor plan images, and a matching degree between a boundary of each of the multiple second floor plan images and the boundary of the target building satisfying a preset condition; for each of the second floor plan images, applying a layout constraint of each of the second floor plan images to the boundary of the target building, and obtaining a layout of the target building corresponding to each of the multiple second floor plan images; and for each layout of the target building, inputting the layout of the target building and the boundary of the target building into a floor plan image generating network, and obtaining a predicted floor plan image of the target building outputted by the floor plan image generating network. The predicted floor plan image includes a room bounding box of each room in the target building and a positional relation of each room bounding box in the boundary of the target building.

In a fourth aspect, a non-transitory computer-readable storage medium is provided. Computer programs are stored on the non-transitory computer-readable storage medium, and the computer programs, when being executed by a processor, perform: acquiring a boundary of a target building and a layout constraint of the target building, the layout constraint including room types, room quantities, room locations, and adjacency relations between rooms; outputting multiple first floor plan images according to the layout constraint of the target building; selecting multiple second floor plan images from the multiple first floor plan images, and a matching degree between a boundary of each of the multiple second floor plan images and the boundary of the target building satisfying a preset condition; for each of the second floor plan images, applying a layout constraint of each of the second floor plan images to the boundary of the target building, and obtaining a layout of the target building corresponding to each of the multiple second floor plan images; and for each layout of the target building, inputting the layout of the target building and the boundary of the target building into a floor plan image generating network, and obtaining a predicted floor plan image of the target building outputted by the floor plan image generating network. The predicted floor plan image includes a room bounding box of each room in the target building and a positional relation of each room bounding box in the boundary of the target building.

The floor plan image generating method and device, the computer device, and the storage medium above are implemented by means of: acquiring a boundary of a target building and a layout constraint of the target building, the layout constraint including room types, room quantities, room locations, and adjacency relations between rooms; then, outputting multiple first floor plan images according to the layout constraint of the target building; then, selecting multiple second floor plan images from the multiple first floor plan images, and a matching degree between a boundary of each of the multiple second floor plan images and the boundary of the target building satisfying a preset condition; for each of the second floor plan images, applying a layout constraint of each of the second floor plan images to the boundary of the target building, and obtaining a layout of the target building corresponding to each of the multiple second floor plan images; and finally, for each layout of the target building, inputting the layout of the target building and the boundary of the target building into a floor plan image generating network, and obtaining a predicted floor plan image of the target building outputted by the floor plan image generating network, wherein the predicted floor plan image includes a room bounding box of each room in the target building and a positional relation of each room bounding box in the boundary of the target building. In the floor plan image generating method provided by the present application, during the generation of the floor plan image, not only the boundary of the building, but also the layout constraint of the building is fully considered, therefore the predicted floor plan image finally generated meets the actual needs better, thereby improving the quality of the generated floor plan image.

DETAILED DESCRIPTION OF THE EMBODIMENTS

In order to make the objective, technical solutions and advantages of the present application clearer and better understood, the present application will be further described in detail with reference to the accompanying drawings and embodiments. It should be understood that the embodiments described hereinafter are only used to explain the present application, but not intended to limit the present application.

Figure 1:
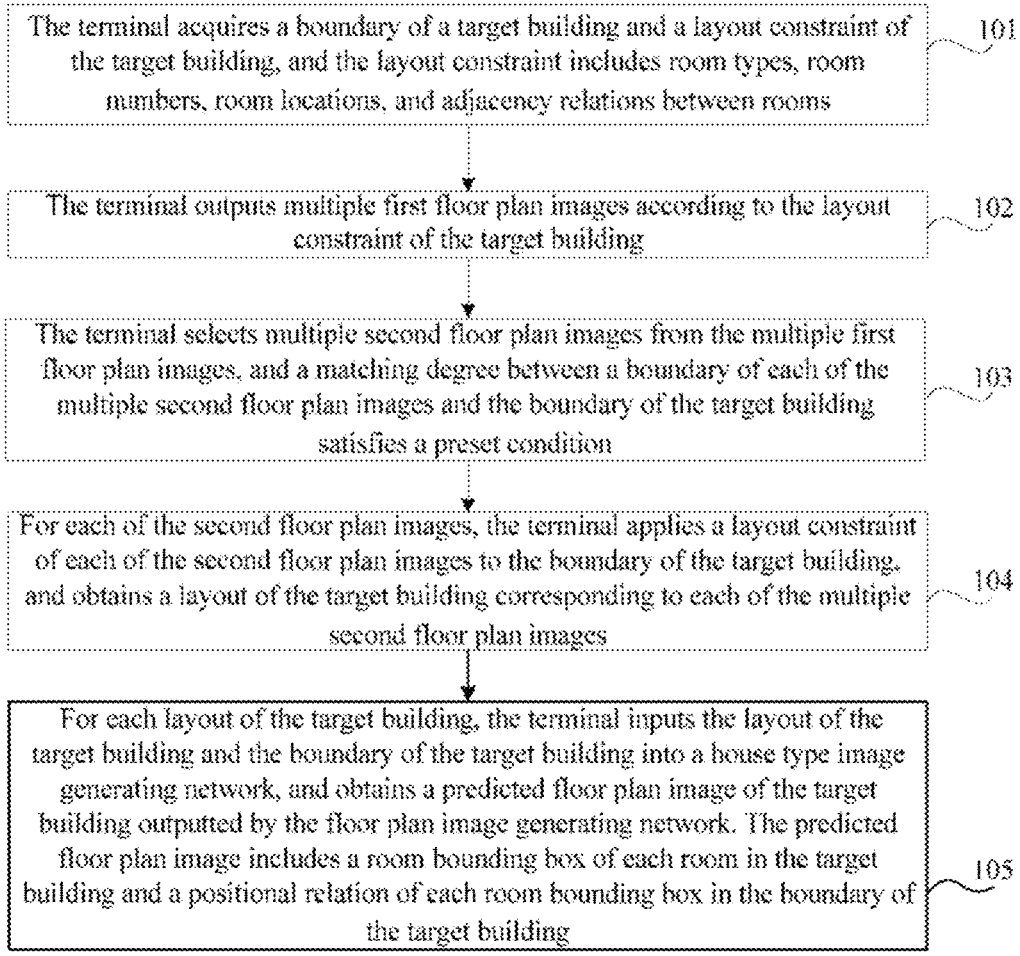
FIG. 1 is a schematic flowchart of a floor plan image generating method of an embodiment.

In an embodiment of the present application, as shown in FIG. 1, a floor plan image generating method is provided. Taking the method applied to a terminal as an example, the terminal may be, but is not limited to, any one of various personal computers, notebook computers, smartphones, panel computers, and portable wearable devices, and the method includes the following step 101 to step 105.

At step 101, the terminal acquires a boundary of a target building and a layout constraint of the target building, and the layout constraint includes room types, room quantities, room locations, and adjacency relations between rooms.

The boundary of the target building mentioned in this step refers to an outline shape of the house type of the target building. Optionally, a user may manually input the boundary of the target building into the terminal, or a measuring device may measure the target building and send acquired outline data of the house type to the terminal. In an embodiment, the terminal has a measurement function, and may directly measure the target building to acquire the boundary of the target building.

The layout constraint of the target building is inputted into the terminal by the user according to actual needs. Optionally, a dialog box may be displayed on the terminal, so that the user may input the desired room types, room quantities, room locations, adjacency relations between rooms, and other information into the dialog box of the terminal. In addition, the terminal may display the boundary of the target building to the user, and the user may roughly draw the desired room types, room quantities, room locations, and the adjacency relations between rooms in the boundary of the target building by means of an external device such as a mouse.

At step 102, the terminal outputs multiple first floor plan images according to the layout constraint of the target building.

At this step, after acquiring the layout constraint of the target building, the terminal outputs the first floor plan images that meets the layout constraint required by the user. In an embodiment, the same layout constraint may have multiple layout forms. To achieve an aimed accuracy, the room quantities, the room types, the room locations and the adjacency relations between rooms of these first floor plan images may fully meet the user's requirements. However, in some possible cases, in order to provide various floor plan images as possible, the layout constraint of the outputted first floor plan images may also partially satisfy the user's requirements. For example, the number of the rooms required by the user is four, and the number of the rooms in the outputted first floor plan image may be three or five. The matching degree between the layout constraint of the first floor plan image and the layout constraint inputted by the user may be preset.

At step 103, the terminal selects multiple second floor plan images from the multiple first floor plan images, and a matching degree between a boundary of each of the multiple second floor plan images and the boundary of the target building satisfies a preset condition.

The layout constraint of the first floor plan image meets the requirement of the user, but the boundary of the first floor plan image may not necessarily meet the boundary of the target building. Therefore, a selection needs to be performed again to obtain the floor plan images, whose layout constraint and boundary both meet the requirements, from the first floor plan images.

In an embodiment, a method for judging the matching degree between the boundary of the first floor plan image and the boundary of the target building at this step may include: overlapping and comparing an area enclosed by the boundary of the first floor plan image and an area enclosed by the boundary of the target building, calculating a ratio of an area of an overlap region to the area enclosed by the boundary of the target building, and selecting the first floor plan image to be the second floor plan image if the ratio exceeds a preset area threshold. In an embodiment, at the terminal, each of the first floor plan images is displayed in the boundary of the target building inputted by the user, so that the user can intuitively analyze the matching degree between the first floor plan image and the boundary and select the second floor plan image.

In addition, the method for judging the matching degree between the boundary of the first floor plan image and the boundary of the target building may also include: calculating a perimeter of a boundary and the number of corners of the first floor plan image and a perimeter of the boundary and the number of corners of the target building, then selecting the first floor plan image to be the second floor plan image, if a difference between the perimeter of the boundary of the first floor plan image and the perimeter of the boundary of the target building is less than a preset perimeter difference threshold, and if a difference between the number of corners of the first floor plan image and the number of corners of the target building is less than a preset number difference threshold.

In an embodiment, a turning function of the boundary of the first floor plan image and a turning function of the boundary of the target building may be calculated, then the two turning functions are compared, and the second floor plan image may be selected from the first floor plan image according to a result of comparison.

At Step 104, for each of the second floor plan images, the terminal applies a layout constraint of each of the second floor plan images to the boundary of the target building, and obtains a layout of the target building corresponding to each of the multiple second floor plan images.

After the second floor plan image whose layout constraint and boundary both meet the user's requirements is selected, the layout of the second floor plan image may be directly applied to the boundary of the target building. Under the same layout constraint, there may be various forms of floor plan images, so the selected second floor plan images may have multiple forms of layouts. Between the floor plan images with the same or similar boundaries, the applicability is stronger after the layout constraint is directly used, therefore the layout constraint of the second floor plan image may be directly applied to the boundary of the target building to obtain various layouts of the target building.

At Step 105, for each layout of the target building, the terminal inputs the layout of the target building and the boundary of the target building into a floor plan image generating network, and obtains a predicted floor plan image of the target building outputted by the floor plan image generating network. The predicted floor plan image includes a room bounding box of each room in the target building and a positional relation of each room bounding box in the boundary of the target building.

The multiple layouts of the target buildings obtained at the step above are multiple layouts just applied to the boundary of the target building, and specific floor plan images of the target building is not formed. Therefore, each layout of the target building is necessarily inputted into the floor plan image generating network to obtain more accurate floor plan images. The multiple predicted floor plan images obtained at this step may be provided for the user to select, and provided for guiding the user to lay out the house type of the target building. At this step, the predicted floor plan images may be presented by the terminal in a visual display, and the displayed contents include displaying a boundary shape of the target building and displaying room bounding box of each room at the corresponding position in the boundary shape.

In the floor plan image generating method above, the boundary of the target building and the layout constraint of the target building are acquired, and the layout constraint includes the room types, the room quantities, the room locations, and the adjacency relations between rooms. Then the multiple first floor plan images are provided according to the layout constraint of the target building. Then, the multiple second floor plan images are selected from the multiple first floor plan images, and the matching degree between the boundary of each of the multiple second floor plan images and the boundary of the target building satisfies the preset condition. For each of the second floor plan images, the layout constraint of each of the second floor plan images is applied to the boundary of the target building, and the layout of the target building corresponding to each second floor plan image is obtained. Finally, for each of the layouts of the target building, the each of the layouts of the target building and the boundary of the target building are inputted into the floor plan image generating network, and the predicted floor plan image of the target building outputted by the floor plan image generating network are obtained. The predicted floor plan image includes the room bounding box of each room in the target building and the positional relation of each room bounding box in the boundary of the target building. In the floor plan image generating method provided by the present application, during the generation of the floor plan image, not only the boundary of the building, but also the layout constraint of the building is fully considered, therefore the predicted floor plan image finally generated meets the actual needs better, thereby improving the quality of the generated floor plan image.

In this embodiment of the present application, the outputting the multiple first floor plan images according to the layout constraint of the target building includes the following step.

The multiple first floor plan images that satisfy the layout constraint of the target building are retrieved from a pre-stored floor plan image data set.

Optionally, the terminal may pre-store a large number of floor plan image data, then encode and store the large number of floor plan image data. The advantage of encoding is that, in subsequent steps, the first floor plan image corresponding to the layout constraint of the target building inputted by the user may be retrieved quickly In an embodiment, the way of encoding the floor plan image may be encoding the room types, the room quantities, the room locations and the adjacency relations between rooms in the floor plan image.

The way of coding will be described in detail herein. First, each room in the floor plan image may be represented by a node, and if two rooms have an adjacency relationship in the floor plan image, an edge is added between the nodes corresponding to the rooms. The room types are divided into 13 types, including living room, master bedroom, secondary bedroom, guest room, child room, reading room, dining room, bathroom, kitchen, balcony, storage room, wardrobe and antechamber. The room types may be encoded in sequence with numerals 1, 2, 3, 4, 5, 6, 7, 8, 9, 10, 11, 12, and 13. Then, in order to encode the room locations, the boundary of the target building may be replaced with a rectangular bounding box to get the bounding box of the target building, and then the rectangular bounding box is divided into a K×K grid, where K is a positive integer greater than or equal to 1. A grid coordinate where a center of each room in the floor plan image is located is used as the code of the room position. For the adjacency relation between rooms, all interior doors in the floor plan image are found first, then rooms on both sides of a door is taken as an adjacent room pair. Next, it may be examined whether a distance between any two rooms is less than a given threshold relative to the room bounding box, that is, it may be determined whether there is an adjacency relation of sharing a wall between two rooms. For each pair of adjacent rooms, the edge connecting the two rooms is encoded, and the code may be represented by left, right, upper, lower, upper left, upper right, lower left, or lower right, which represents a relative positional relationship between two rooms. Since the relative positional relationship between rooms is relative, for example, taking B as a reference, if A is over B, the edge connecting A and B may be encoded as "upper", but if A is taken as a reference, and B is below A, then the edge connecting A and B may be encoded as "lower". Although the two codes are different formally, they are the same essentially. Therefore, in an actual process of encoding, two relative codes may be stored for an edge at the same time, or one relative code may be randomly selected to be stored. In addition, the room sizes may also be encoded, and a ratio of an area of a room to the entire area of the floor plan image is used as a code of a room size.

The coding method above may be applied to the layout constraint inputted by the user. After the layout constraint inputted by the user is encoded by using the same means of coding, the first floor plan images that meet the user's requirements may be selected by means of relatively simple codes, thereby greatly improving the efficiency of selecting the first floor plan images by the terminal.

Figure 2:
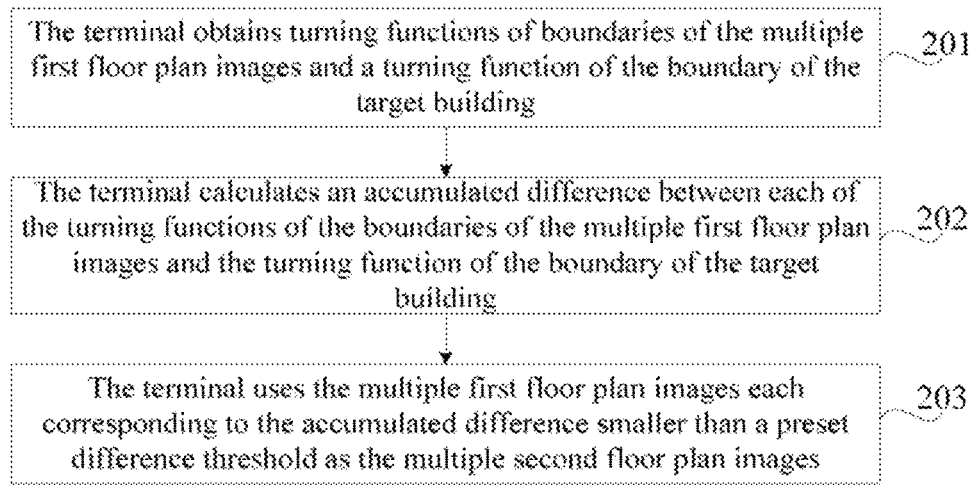
FIG. 2 is a schematic flowchart of a method for selecting multiple second floor plan images from multiple first floor plan images according to an embodiment of the floor plan image generating method.

In an embodiment of the present application, referring to FIG. 2, in the floor plan image generating method, a method for selecting multiple second floor plan images from multiple first floor plan images includes the following step 201 to step 203.

At Step 201, the terminal obtains turning functions of boundaries of the multiple first floor plan images and a turning function of the boundary of the target building.

The turning function may convert a two-dimensional polygon of the boundary into a one-dimensional contour line segment to achieve the purpose of reducing dimensions, so as to facilitate a comparison of the matching degree of boundaries. The one-dimensional contour line segment is located in a coordinate system formed by a normalized accumulated boundary length and an accumulated angle. The turning function may record a cumulated angle value of each turning point (corner) in the two-dimensional polygon of the boundary.

In an embodiment, starting from a front door of the floor plan image, the accumulated angle value of each turning point (corner) in the two-dimensional polygon of the boundary may be recorded clockwise. In a possible case, even for two buildings with the exact same boundary, a different front door position will lead to significant changes in the floor plan image, which means that the front door positions need to be considered when two boundaries are compared, so the turning function of the target building and the turning function of the first floor plan image are recorded starting from the position of the front door.

At Step 202, the terminal calculates an accumulated difference between each of the turning functions of the boundaries of the multiple first floor plan images and the turning function of the boundary of the target building.

After the turning function of the boundary of the target building and the turning function of the first floor plan image are obtained, the accumulated difference between the two turning functions needs to be calculated. In an embodiment, an area enclosed by the difference between the two turning functions and a normalized accumulated boundary length axis of the coordinate system may be used as the accumulated difference.

At Step 203, the terminal uses the multiple first floor plan images each corresponding to the accumulated difference smaller than a preset difference threshold as the multiple second floor plan images.

The smaller the accumulated difference between the turning function of the boundary of the target building and the turning function of the boundary of the first floor plan image, the higher a similarity between the boundary of the target building and the boundary of the first floor plan image. At this step, the preset difference threshold is set to select the second floor plan images. In this case, the boundary of the selected second floor plan image is still a little different from the boundary of the target building, but the difference is within an acceptable range.

In addition, if it is desired to obtain the second floor plan image that exactly matches the boundary of the target building, the first floor plan image with a zero accumulated difference may be selected.

In the embodiment of the present application, by using the turning function, a comparison of the two-dimensional boundaries is converted into a mathematical calculation of the one-dimensional contour line segments, thereby greatly improving the efficiency and the accuracy of selecting the second floor plan image.

Figure 3:
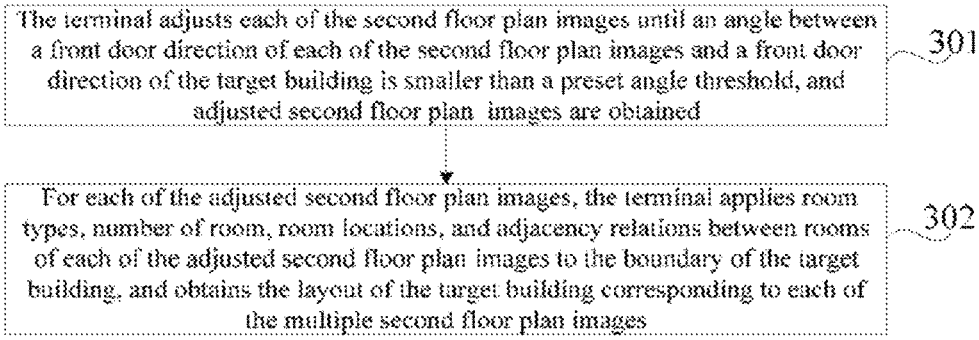
FIG. 3 is a schematic flowchart of a method for obtaining a layout of a target building corresponding to each second floor plan image for each second floor plan image, by applying a layout constraint of the second floor plan image to a boundary of the target building, according to an embodiment of the floor plan image generating method.

In an embodiment of the present application, referring to FIG. 3, in the floor plan image generating method, a method for obtaining the layout of the target building corresponding to each second floor plan image by applying the layout constraint of the second floor plan image to the boundary of the target building for each second floor plan image includes the following step 301 to step 302.

At Step 301, the terminal adjusts each of the second floor plan images until an angle between a front door direction of each of the second floor plan images and a front door direction of the target building is smaller than a preset angle threshold, and adjusted second floor plan images are obtained.

At this step, before applying the layout constraint of the second floor plan image to the boundary of the target building, the second floor plan image needs to be adjusted, so that the boundary of the adjusted second floor plan image and the boundary of the target building overlap with the greatest ratio. Because the boundary overlap ratio is calculated based on the turning function starting from the front door, so the front door is used as a reference point for alignment. First, the front doors of the two boundaries are aligned, which also prevents the front doors from being blocked by any room. The criterion for judging whether the front doors are aligned is to judge whether an angle between the front door direction of a rotated second floor plan image and the front door direction of the target building is smaller than the preset angle, such as 45 degrees, etc. The front door direction mentioned in this application is a vector connecting a center of the building bounding box to a center of the door, or a vector connecting the center of the bounding box of the rotated second floor plan image to the front door.

It should be noted that, in the process of rotating the second floor plan image, the bottom edge of the rotated second floor plan image must be kept horizontal, and the perpendicular edges should be kept vertical as much as possible. Only such a floor plan image is a valid floor plan image.

At Step 302, for each of the adjusted second floor plan images, the terminal applies room types, room quantities, room locations, and adjacency relations between rooms of each of the adjusted second floor plan images to the boundary of the target building, and obtains the layout of the target building corresponding to each of the multiple second floor plan images.

After the second floor plan image is adjusted, the layout constraint of the adjusted second floor plan image is transferred into the boundary of the target building. The way of transfer may be a full replication, that is, the rooms of the target building are completely laid out according to the room types, room quantities, room locations, and adjacency relations between rooms in the adjusted second floor plan image.

However, since the boundary of the adjusted second floor plan image is still different from the boundary of the target building, after the layout constraint of the adjusted second floor plan image is directly applied to the boundary of the target building, some room nodes may be laid outside the boundary, which obviously does not meet the actual requirements. Therefore, the obtained each layout of the target building may be readjusted to ensure that all room nodes fall in the boundary of the target building. In an embodiment, the way of adjusting the node outside the boundary may include following steps: establishing a bounding box of the target building and grids in the bounding box firstly, then searching grid where the node outside the boundary is located, further moving the node outside the boundary into the nearest grid within the boundary. If there has been a node already in the nearest grid within the boundary, the existing node in the grid is moved to a new grid in the same direction. If a node is moved in the same direction to the last grid within the boundary, and there still has been another node in the last grid, then two nodes are kept in the last grid. The same direction above refers to the same direction along which the node outside the boundary is moved into the nearest grid within the boundary.

The way of adjusting the node outside the boundary above may be executed by the terminal automatically or by editing the multiple layouts of the target building by the user himself/herself after the terminal displays the multiple layouts of the target building.

In the embodiment of the present application, the second floor plan images are adjusted, the layout constraint of each of the adjusted second floor plan images is applied to the boundary of the target building, and the node outside the boundary is further adjusted, so that the layout of the target building obtained finally is more accurate and meets the actual needs better.

Figure 4:
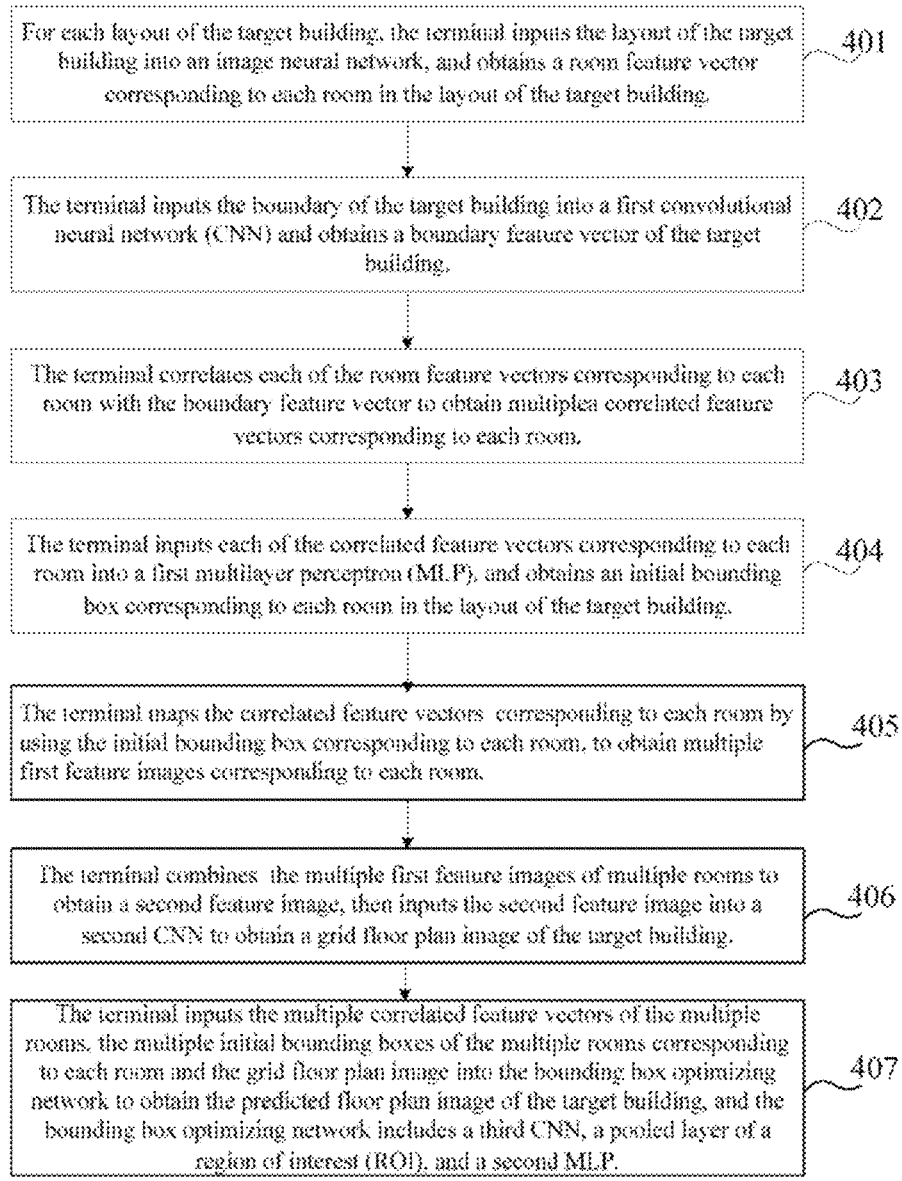
FIG. 4 is a schematic flowchart of a method for obtaining a predicted floor plan image of the target building outputted by a floor plan image generating network for each layout of the target building, by inputting the layout of the target building and the boundary of the target building into the floor plan image generating network, according to another embodiment of the floor plan image generating method.

In an embodiment of the present application, referring to FIG. 4, in the floor plan image generating method, a method for obtaining the predicted floor plan image of the target building outputted by the floor plan image generating network for each layout of the target building, by inputting the layout of the target building and the boundary of the target building into the floor plan image generating network includes the following step 401 to step 407.

At Step 401, for each layout of the target building, the terminal inputs the layout of the target building into an image neural network (NN), and obtains a room feature vector corresponding to each room in the layout of the target building.

At Step 402, the terminal inputs the boundary of the target building into a first convolutional neural network (CNN) and obtains a boundary feature vector of the target building.

At Step 403, the terminal correlates the room feature vector corresponding to each room with the boundary feature vector to obtain a correlated feature vector corresponding to each room.

At Step 404, the terminal inputs the correlated feature vector corresponding to each room into a first multilayer perceptron (MLP), and obtains an initial bounding box corresponding to each room in the layout of the target building.

At Step 405, the terminal maps the correlated feature vector corresponding to each room by using the initial bounding box corresponding to each room, to obtain a first feature image corresponding to each room.

At Step 406, the terminal combines multiple first feature images of multiple rooms to obtain a second feature image, then inputs the second feature image into a second CNN to obtain a grid floor plan image of the target building.

At Step 407, the terminal inputs the multiple correlated feature vectors of the multiple rooms, the multiple initial bounding boxes of the multiple rooms and the grid floor plan image into the bounding box optimizing network to obtain the predicted floor plan image of the target building, and the bounding box optimizing network includes a third CNN, a pooled layer of a region of interest (ROI), and a second MLP.

Figure 5:
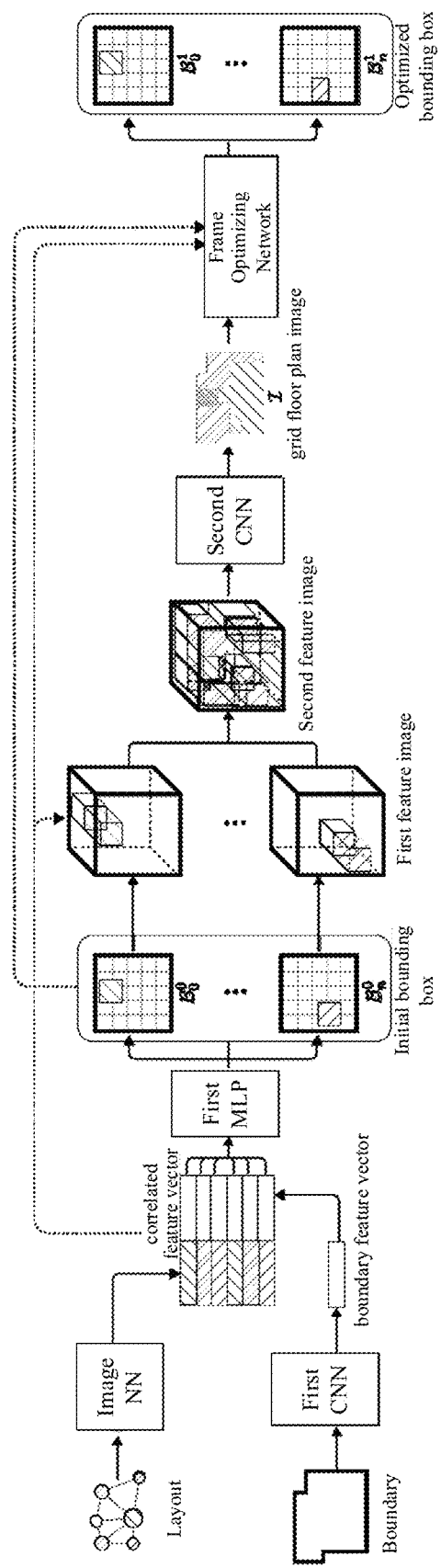
FIG. 5 is a schematic view showing a specific structure of a floor plan image generating network according to an embodiment.

The above step 401 to step 407 will be described with reference to a specific structure of the floor plan image generating network of FIG. 5. The layout constraint and the boundary of the target building in FIG. 5 are inputted into different neural networks respectively to obtain the correlated feature vector corresponding to each room. The MLP may be used to predict the initial bounding box (represented by $B_i^0$ in FIG. 5, where i denotes any positive integer between 0 and n) corresponding to each room within the boundary, map the correlated feature vector corresponding to each room by using the initial bounding box corresponding to each room to obtain the first feature image corresponding to each room, combine the obtained multiple first feature images of the multiple rooms to obtain the second feature image, then input the second feature image into the second CNN to obtain the grid floor plan image. After the grid floor plan image is obtained, previously obtained initial bounding boxes may be optimized by a bounding box optimizing network to obtain more accurate and optimized bounding boxes (represented by $B_i^0$ in FIG. 5, where i denotes any positive integer between 0 and n). In the whole process, the outputs of the floor plan image generating network, including the initial bounding box corresponding to each room, the grid floor plan image, and the optimized bounding box corresponding to each room, may be obtained. The optimized bounding boxes may be combined to serve as the predicted floor plan image of the target building.

Figure 6:
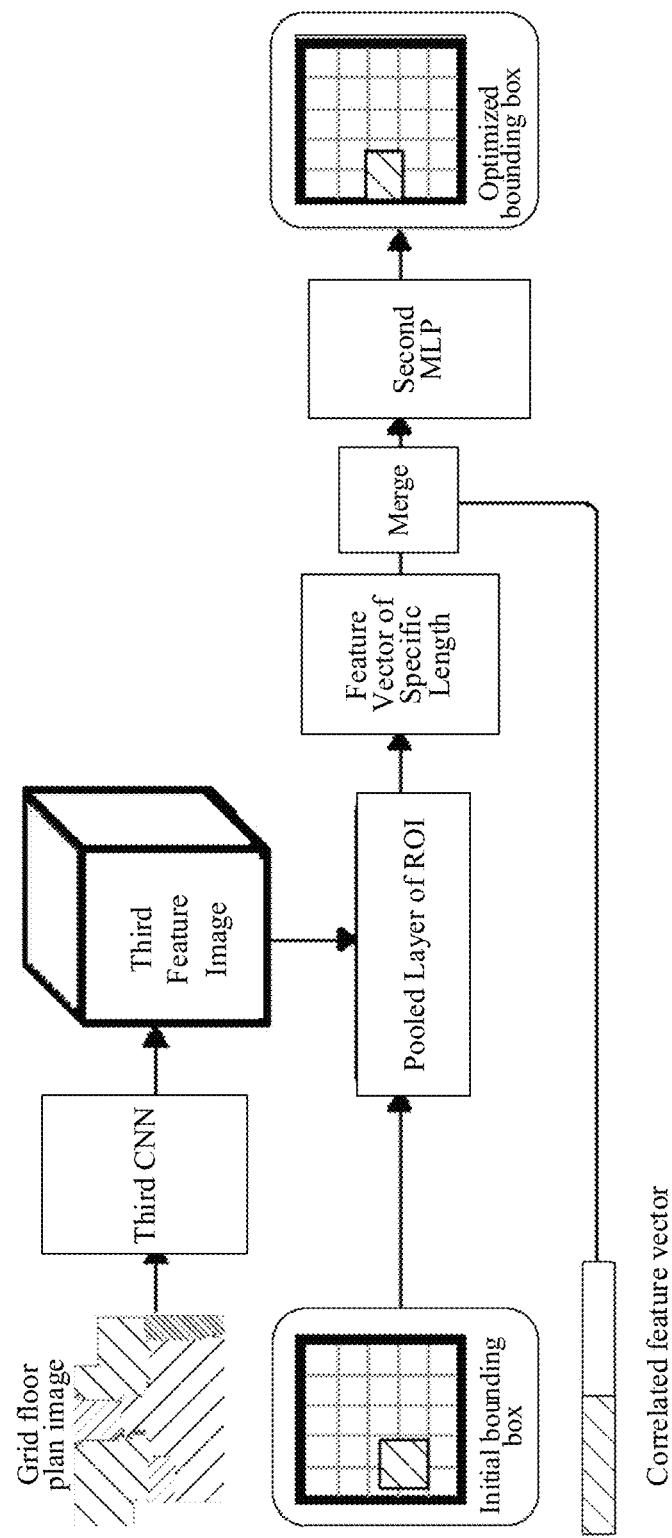
FIG. 6 is a schematic view showing a specific structure of a bounding box optimizing network according to an embodiment.

A specific structure of the bounding box optimizing network above may refer to FIG. 6. As shown in FIG. 6, the bounding box optimizing network includes the third CNN, the pooled layer of the ROI, and the second MLP. First, the grid floor plan image is processed by the third CNN to obtain a third feature image, then the initial bounding box corresponding to each room and the third feature image are inputted into the pooled layer of the ROI to obtain a feature vector with a specific length corresponding to each room. Then the feature vector with the specific length corresponding to each room and the correlated feature vector corresponding to each room are merged and inputted into the second MLP to obtain an optimized bounding box corresponding to each room. Further, a visual position relationship of the room bounding box of each room within the boundary of the target building may be predicted according to the optimized bounding box of each room.

In the embodiment of the present application, the floor plan image generating network may be formed by using a combination of multiple types of networks to generate the predicted floor plan image, which makes the predicted floor plan image more accurate and have higher quality.

Figure 7:
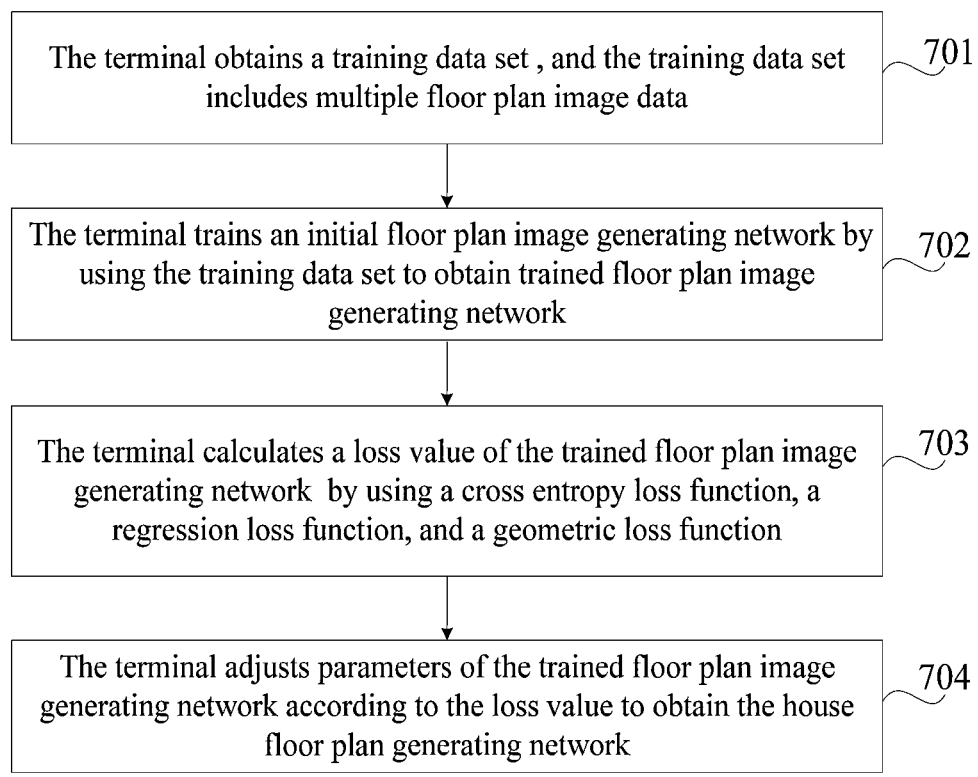
FIG. 7 is a schematic flowchart of a method for training the floor plan image generating network according to an embodiment of the floor plan image generating method.

In an embodiment of the present application, referring to FIG. 7, in the floor plan image generating method, a method for training the floor plan image generating network includes the following step 701 to step 704.

At Step 701, the terminal obtains a training data set, and the training data set includes multiple floor plan image data.

At this step, a large number of floor plan images may be obtained from a large number of resources on the Internet. After a large number of floor plan images are obtained, the obtained large number of floor plan images may be preprocessed. The preprocessing includes converting color floor plan images into grayscale images, adjusting resolutions of all floor plan images to the same resolution, adjusting all floor plan images to have the same size, or encoding all floor plan images by using the encoding method described above, etc. After the collected floor plan images are preprocessed, the processed floor plan images may be stored. In the process of training the floor plan image generating network, all networks included in FIG. 5 are actually trained.

At Step 702, the terminal trains an initial floor plan image generating network by using the training data set to obtain trained floor plan image generating network.

At Step 703, the terminal calculates a loss value of the trained floor plan image generating network by using a cross entropy loss function, a regression loss function, and a geometric loss function.

At Step 704, the terminal adjusts parameters of the trained floor plan image generating network according to the loss value to obtain the floor plan image generating network.

In order to ensure that the trained floor plan image generating network has good performance, multiple types of loss functions are used in this step to calculate the loss value of the floor plan image generating network.

The loss value is calculated by using the following equation:

$$L=L_{pix}(I)+L_{reg}(\{B_i^0\})+L_{geo}(\{B_i^0\})+L_{reg}(\{B_i^1\})$$

Where, $L_{pix}(I)$ denotes an image loss of the cross entropy of the predicted floor plan image and the actual floor plan image, $L_{reg}(\{B_i^0\})$ and $L_{reg}(\{B_i^1\})$ denote regression losses, $L_{geo}(\{B_i\})$ denotes a geometric loss. The geometric loss is only applicable to the initial bounding box, and the geometric loss of the initial bounding box $B_i^0$ is defined as:

$$L_{geo}(\{B_i^0\})=L_{coverage}(\{B_i^0\})+L_{interior}(\{B_i^0\})+L_{mutex}(\{B_i^0\})+L_{match}(\{B_i^0\})$$

Where, $L_{coverage}$ and $L_{interior}$ both constrain a spatial consistency between the boundary and the room bounding box, $L_{mutex}$ constrains a spatial consistency between any two room bounding boxes, and $L_{match}(\{B_i^0\})$ ensure that a predicted bounding box matches an actual bounding box. The first three terms ensure that the room bounding boxes properly cover the interior of the building. The last term, which makes a comparison between the predicted bounding box with the actual bounding box, and ensures that, during a training, the prediction of a position and a size of the room bounding box is also improved.

Before providing more detailed information about the terms of the geometric loss, firstly, two distance functions $d_{in}(p, B)$ and $d_{out}(p, B)$ are defined, and $d_{in}(p, B)$ denotes a distance between a point p and the inside of the bounding box B, and $d_{out}(p, B)$ denotes a distance between the point p and the outside of the bounding box B. The point p is an arbitrary point, and $d_{in}(p, B)$ and $d_{out}(p, B)$ are as follows:

$$d_{in}(p, B) = \begin{cases} 0, & \text{if } p \in \Omega_{in}(B); \\ \min_{q \in \Omega_{bd}(B)} \|p - q\|, & \text{otherwise} \end{cases}$$

$$d_{out}(p, B) = \begin{cases} 0, & \text{if } p \notin \Omega_{in}(B); \\ \min_{q \in \Omega_{bd}(B)} \|p - q\|, & \text{otherwise} \end{cases}$$

Where, a set $\Omega_{in}(B)$ and a set $\Omega_{bd}(B)$ represent pixel points inside the bounding box B and pixel points of an outer boundary, respectively.

For a coverage loss, the boundary of the target building should be completely covered by the combination of all room bounding boxes. In an embodiment, any point $P \in \Omega_{in}(B)$ should be covered by at least one room bounding box, therefore, the coverage loss is defined as follows:

$$L_{coverage}(\{B_i\}) = \frac{\sum_{p \in \Omega_{in}(B)} \min_i d_{in}(p, B)^2}{|\Omega_{in}(B)|}$$

Where, $|\Omega_{in}(B)|$ denotes the number of pixels in $\Omega_{in}(B)$.

For an internal loss, each room bounding box should be located within the target building bounding box ($\hat{B}$). Therefore, the internal loss may be defined as:

$$L_{interior}(\{B_i\}) = \frac{\sum_i \sum_{p \in \Omega_{in}(B_i)} d_{in}(p, \hat{B})^2}{\sum_i |\Omega_{in}(B_i)|}$$

For a mutex loss, the overlap between room bounding boxes should be as small as possible, such that the rooms may be compactly distributed inside the target building. Therefore, the mutex loss may be defined as:

$$L_{mutex}(\{B_i\}) = \frac{\sum_i \sum_{p \in \Omega_{in}(B_i)} \sum_{j \neq i} d_{in}(p, \hat{B})^2}{\sum_i \sum_{p \in \Omega_{in}(B_i)} \sum_{j \neq i} 1}$$

For a match loss, each room bounding box $B_i$ should cover the same region as the corresponding actual bounding box $B_i^*$ does, that is, the room bounding box $B_i$ should be displayed inside the actual bounding box $B_i^*$. Therefore, the match loss may be defined as:

$$L_{match}(\{B_i\}) = \frac{\sum_i \sum_{p \in \Omega_{in}(B_i)} d_{in}(p, B_i^*)^2}{\sum_i |\Omega_{in}(B_i)|} + \frac{\sum_i \sum_{p \in \Omega_{in}(B_i^*)} d_{in}(p, B_i)^2}{\sum_i |\Omega_{in}(B_i^*)|}$$

In the embodiment of the present application, by setting various loss functions, various losses are considered, which makes the trained floor plan image generating network finally obtained have better prediction performance.

In the embodiment of the present application, after obtaining the predicted floor plan image of the target building outputted by the floor plan image generating network, the method further includes the following steps.

Each room bounding box of the target building is aligned with the boundary of the target building.

Adjacent room bounding boxes of the target building are aligned with each other.

The floor plan image generating network finally outputs the predicted floor plan image and all room bounding boxes. One problem that may occur to the room bounding boxes is that they may not be well aligned, and some room bounding boxes may overlap in some regions. Therefore, in the final alignment and adjustment step, the grid floor plan image is used to determine a room type assignment for an overlap region.

Firstly, the room bounding boxes are aligned with the boundary of the target building, then the adjacent room bounding boxes are aligned with each other. More specifically, for each edge of one room bounding box, a nearest boundary edge thereof with the same direction, i.e., horizontal or vertical edge, is found. If a distance between the edge of the room bounding box and the nearest boundary edge is less than a given distance threshold, the edge of the room bounding box is aligned with the nearest boundary edge. Furthermore, adjacent rooms of a room pair are aligned according to the spatial relationship in the encoded layout. For example, if the room bounding box A is located to the left of the room bounding box B, the right edge of the room bounding box A is aligned with the left edge of the room bounding box B. In addition, if a length difference of the adjacent edges of two room bounding boxes is less than a given distance threshold, then the adjacent edges of the two room bounding boxes will be aligned, because room bounding boxes arranged side by side in the floor plan image preferably have aligned walls to minimize the number of corners. A room bounding box may be adjacent to different room bounding boxes, therefore, the edges may be updated for many times. To avoid breaking previous optimized alignments, a flag may be set to indicate whether an edge of the room bounding box has been updated. If any edge has been updated, it is fixed, another edge is aligned with the fixed edge. If neither edge is fixed, the two edges are updated to their average position.

In addition, it is needed to determine room types for the overlap regions between room bounding boxes. To achieve this purpose, each room pair is examined to determine whether two rooms overlap, and a relative order of the two rooms is determined by using the generated grid floor plan image. More specifically, for each room pair, the number of pixels of each room type in the overlap region is calculated, and a room with fewer pixels in the overlap region is drawn first, so that, when there is an overlap region between two room bounding boxes, the room bounding box drawn later will overlay the room bounding box drawn earlier, so that the overlap region is assigned to the room bounding box drawn later. According to this process, if a first room and a second room overlap, and the first room should be drawn before drawing the second room, then an image is established by adding a node representing each room and a directed edge from the first room to the second room. Then, the goal is to find an order of all nodes in the image, which satisfy an ordering constraint imposed by the directed edges. To find such an order, any node with a zero in-degree is randomly selected firstly, then this node and all edges in the rest of the image to which the node points are deleted. Herein, the in-degree of the node is defined as the number of directed edges pointing to the node. The nodes having zero in-degree are removed continuously till the image becomes blank. It should be noted that, if there is a cycle in the image, it is impossible to find a linear order of nodes in the cycle. Therefore, the node with the smallest in-degree is randomly selected and removed, so as to break the cycle.

In the embodiment of the present application, by optimizing the alignment and determining the labels of the overlap regions, the floor plan image finally obtained may display the specific layout of the target building more accurately.

Based on the embodiments above, a specific embodiment is provided to describe an overall process of the floor plan image generating method of the present application.

Figure 8:
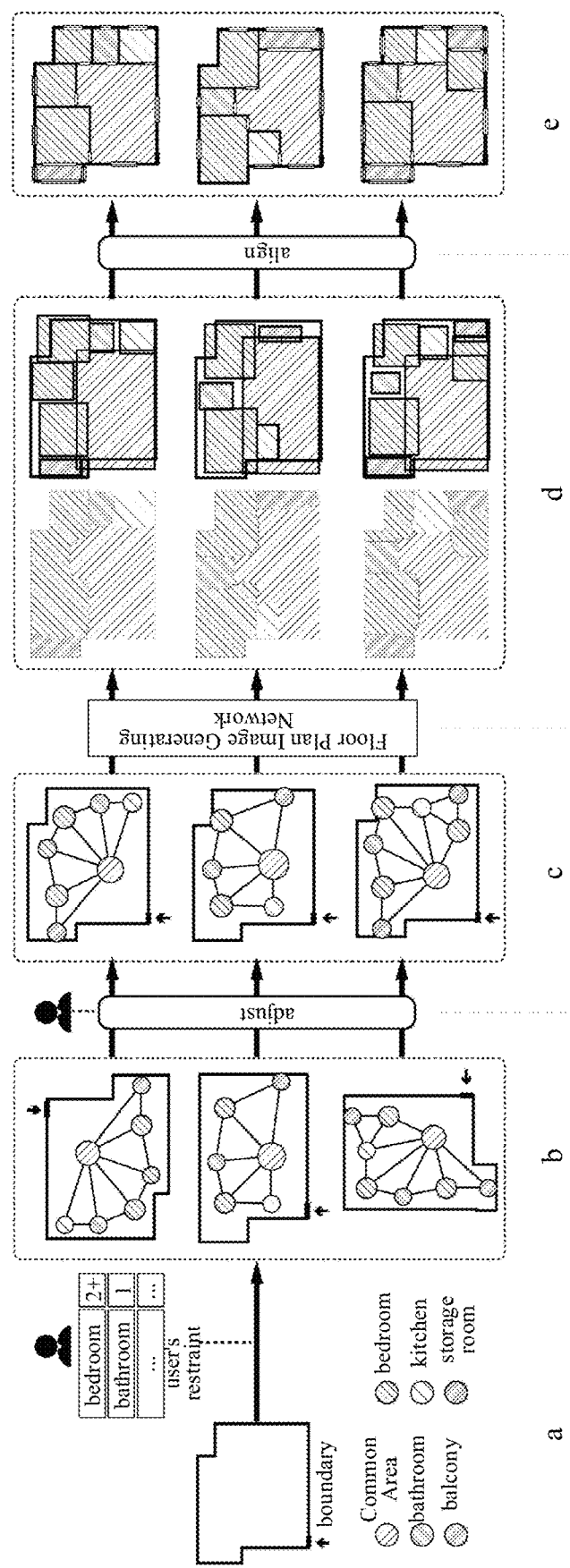
FIG. 8 is a schematic overall flowchart of an embodiment of the floor plan image generating method.

First, the boundary of the target building and the layout constraint of the target building inputted by the user (referring to a in FIG. 8) are obtained, and the first floor plan images (referring to b in FIG. 8), which satisfy the layout constraint inputted by the user, are retrieved from the pre-stored floor plan image data set and displayed. Then, a selection is made among the first floor plan images to obtain the second floor plan images. The selection includes a selection of the matching degree of the boundaries and an adjustment through rotation, which is intended to make the front door direction consistent with the front door direction of the target building, etc. Then, the layout constraint of the second floor plan image is directly applied to the boundary of the target building, and the nodes are adjusted to be within the boundary to obtain the multiple layouts of the target building (referring to c in FIG. 8). The multiple layouts of the target building are inputted into the floor plan image generating network, and the predicted floor plan images and the room bounding boxes (referring to d in FIG. 8) outputted by the floor plan image generating network are obtained. Finally, the adjustment of alignment is performed on the predicted floor plan images to obtain the adjusted floor plan images (referring to e in FIG. 8).

Figure 9:
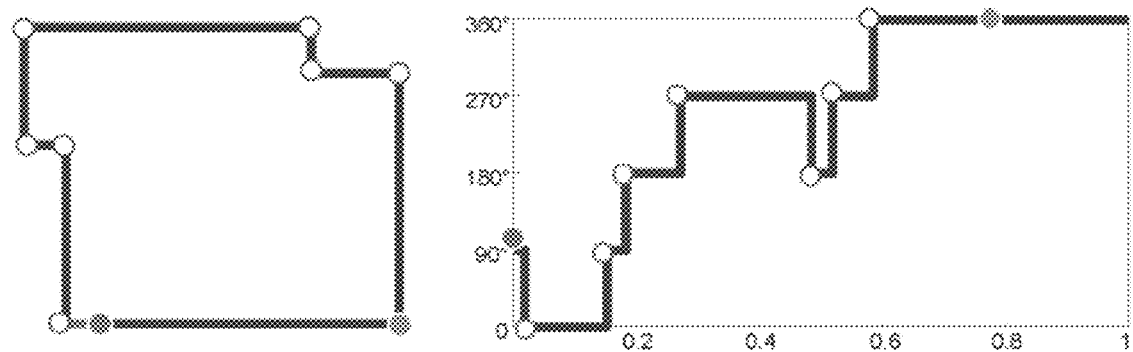
FIG. 9 is schematic view showing the boundary of the target building and a turning function according to an embodiment.

The turning function is used in the selection of the matching degree of the boundaries above. For the specific form of the turning function, please refer to FIG. 9. A left portion of FIG. 9 shows a boundary shape of the target building, and a right portion of FIG. 9 shows the turning function of the boundary of the target building.

Figure 10:
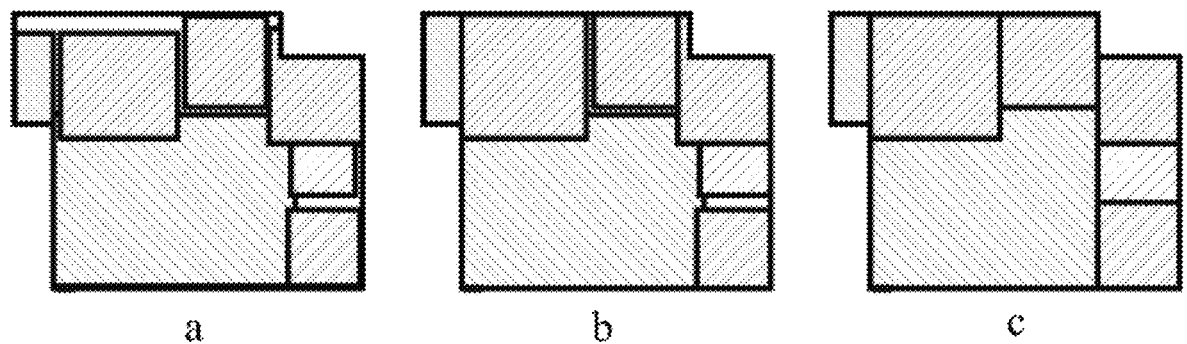
FIG. 10 shows schematic views illustrating alignment and adjustment of a predicted floor plan image according to an embodiment of the floor plan image generating method.

In addition, for the process of adjusting and aligning the predicted floor plan images to obtain the adjusted floor plan images, please refer to FIG. 10. First, the predicted floor plan image (referring to a in FIG. 10) is obtained, then the room bounding boxes are aligned with the boundary of the target building (referring to b in FIG. 10), finally the adjacent room bounding boxes are aligned (referring to c in FIG. 10).

Figure 11:
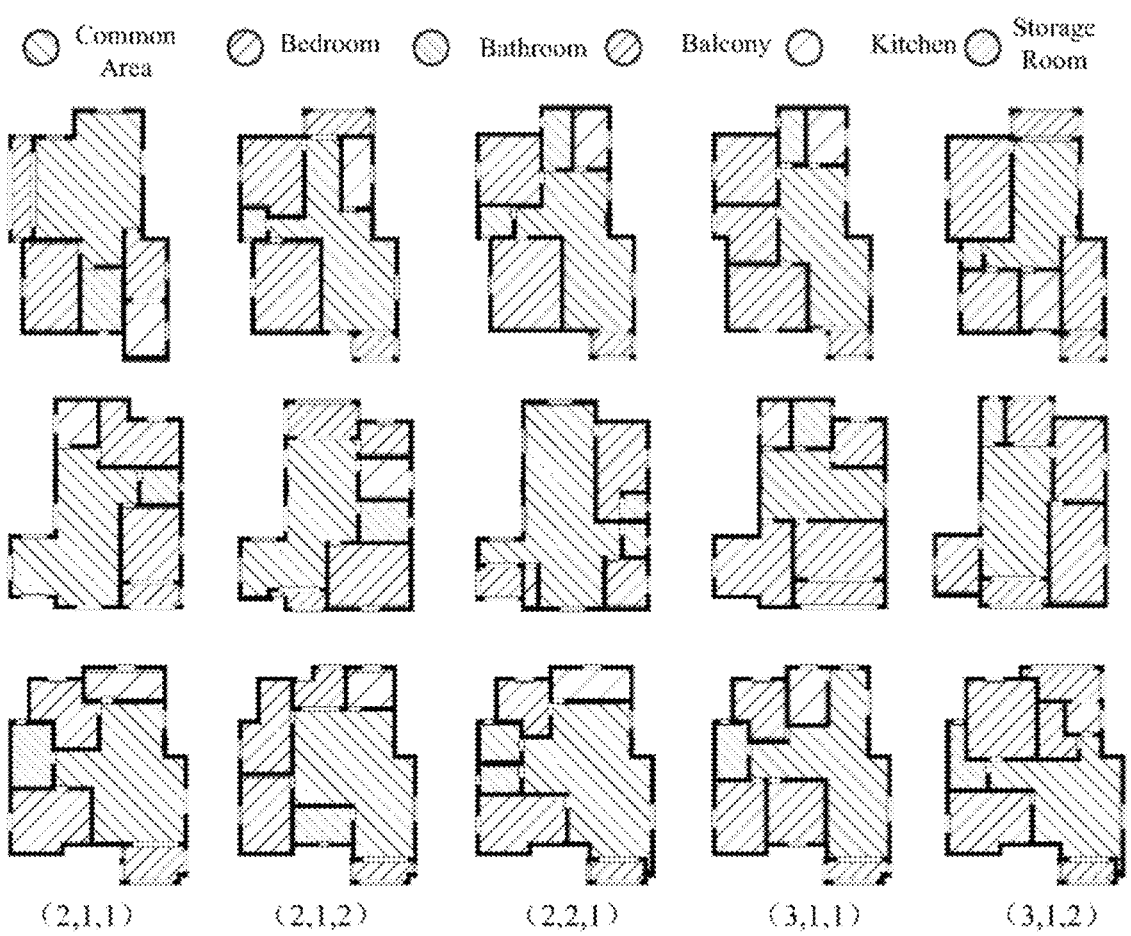
FIG. 11 shows a group of views illustrating exemplary results generated by different boundary inputs and different user constraint conditions according to an embodiment of the floor plan image generating method.

In the embodiments of this application, the floor plan image generating method provided in this application may receive user constraints of different types and different numbers to generate corresponding predicted floor plan images. FIG. 11 shows a group of views illustrating exemplary results generated by different boundary inputs and different user constraint conditions. Views in each row show the result of different layout constraints applied to the same boundary, while views in each column show the result of the same layout constraint applied different boundaries. The selected constraint includes the desired numbers of three room types including bedroom, bathroom, and balcony. The corresponding constraints for the room quantities are shown at the bottom of each column.

After examining each row in FIG. 11, it may be known how the generated predicted floor plan image satisfies the constraint of the given room quantities and fits the boundary. The bedrooms, bathrooms, and balconies of different numbers are generated according to the layout constraints, and the positions of these rooms change so that the floor plan image best fits the inputted boundary. The balcony usually has two or three sides and is located at the target building boundary, and reflects a typical design of balcony in an apartment. Therefore, the positions of the balconies depend on the inputted boundary. There is a living room in all floor plan images, and the living room is located in a building with such a complex boundary, and there may be an extra room.

It may be seen from the results in each column in FIG. 11, how the rooms of the same numbers and same types are distributed differently within buildings with different boundaries. For example, in the third column, two bathrooms are sometimes adjacent to each other and sometimes not adjacent to each other, but are always adjacent to the bedrooms. In the fifth column, the balconies are never adjacent to each other and usually located in different positions of the building, which shows different floor plan images.

As may be seen from the above description, the floor plan image generating method provided in this application may generate various floor plan images according to different boundaries and different layout constraints inputted by the user. Compared with the floor plan images generated through a simple search by a traditional method, the floor plan images generated by the method of the present application have higher quality.

It should be understood that, although the steps in the flowcharts of FIG. 1 to FIG. 8 are shown in sequence indicated by arrows, but these steps are not necessarily executed in the order indicated by the arrows. Unless explicitly stated herein, these steps are not necessarily performed strictly according to an order, and these steps may be performed in any other order. Moreover, at least part of the steps in FIG. 1 to FIG. 8 may include multiple steps or multiple stages, and these steps or stages are not necessarily executed and completed at the same time, but may be executed at different times. These steps or stages are not necessarily executed in sequence, but may be performed in turn or alternately with other steps or with at least a portion of steps or stages in the other steps.

Figure 12:
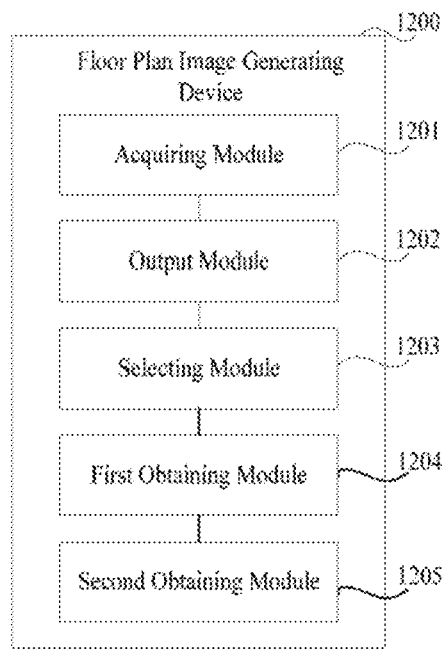
FIG. 12 is a structural block view showing a floor plan image generating device of an embodiment.

In an embodiment of the present application, as shown in FIG. 12, a floor plan image generating device 1200 is provided, and includes: an acquiring module 1201, an output module 1202, a selecting module 1203, a first obtaining module 1204, and a second obtaining module 1205.

The acquiring module 1201 is configured to acquire a boundary of a target building and a layout constraint of the target building, and the layout constraint includes room types, room quantities, room locations, and adjacency relations between rooms.

The output module 1202 is configured to output multiple first floor plan images according to the layout constraint of the target building.

The selecting module 1203 is configured to select multiple second floor plan images from the multiple first floor plan images, and a matching degree between a boundary of each of the multiple second floor plan images and the boundary of the target building satisfies a preset condition.

The first obtaining module 1204 is configured to, for each of the second floor plan images, apply the layout constraint of each of the second floor plan images to the boundary of the target building, and obtain a layout of the target building corresponding o each second floor plan image.

The second obtaining module 1205 is configured to, for each layout of the target building, input the layout of the target building and the boundary of the target building into a floor plan image generating network, and obtain a predicted floor plan image of the target building outputted by the floor plan image generating network. The predicted floor plan image includes a room bounding box of each room in the target building and a positional relation of each room bounding box in the boundary of the target building.

In an embodiment of the present application, the output module 1202 is specifically configured to retrieve the multiple first floor plan images that satisfy the layout constraint of the target building from a pre-stored floor plan image data set.

In an embodiment of the present application, the selecting module 1203 is specifically configured to: obtain turning functions of boundaries of the multiple first floor plan images and a turning function of the boundary of the target building; calculate an accumulated difference between each of the turning functions of the boundaries of the multiple first floor plan images and the turning function of the boundary of the target building; and use the multiple first floor plan images each corresponding to the accumulated difference smaller than a preset difference threshold as the multiple second floor plan images.

In an embodiment of the present application, the first obtaining module 1204 is specifically configured to: adjust each of the second floor plan images until an angle between a front door direction of each of the second floor plan images and a front door direction of the target building is smaller than a preset angle threshold, and obtain adjusted second floor plan images; and for each of the adjusted second floor plan images, apply room types, room quantities, room locations, and adjacency relations between rooms of each of the adjusted second floor plan images to the boundary of the target building, and obtain the layout of the target building corresponding to each of the second floor plan images.

In the embodiment of the present application, the second obtaining module 1205 is specifically used to: for each layout of the target building, input the layout of the target building into an image NN, and obtain a room feature vector corresponding to each room in the layout of the target building; input the boundary of the target building into a first convolutional neural network (CNN) and obtain a boundary feature vector of the target building; correlate the room feature vector corresponding to each room with the boundary feature vector to obtain a correlated feature vector corresponding to each room; input the correlated feature vector corresponding to each room into a first multilayer perceptron (MLP), and obtains an initial bounding box corresponding to each room in the layout of the target building; map the correlated feature vector corresponding to each room by using the initial bounding box corresponding to each room, to obtain a first feature image corresponding to each room; combine multiple first feature images of multiple rooms to obtain a second feature image, then inputs the second feature image into a second CNN to obtain a grid floor plan image of the target building; and input the multiple correlated feature vectors of the multiple rooms, the multiple initial bounding boxes of the multiple rooms and the grid floor plan image into the bounding box optimizing network to obtain the predicted floor plan image of the target building, and the bounding box optimizing network includes a third CNN, a pooled layer of a region of interest (ROI), and a second MLP.

Figure 13:
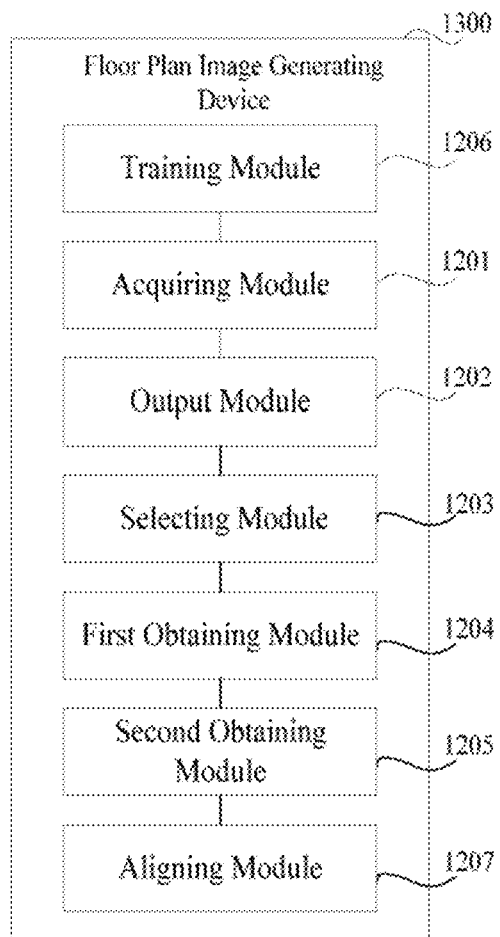
FIG. 13 is a structural block view showing a floor plan image generating device of another embodiment.

In an embodiment of the present application, referring to FIG. 13, another floor plan image generating device 1300 is provided. In addition to the modules included in the floor plan image generating device 1200, optionally, the floor plan image generating device 1300 may also include a training module 1206 and an aligning module 1207.

The training module 1206 is configured to obtain a training data set, which includes multiple floor plan image data; train the initial floor plan image generating network by using the training data set to obtain the trained floor plan image generating network; calculate a loss value of the trained floor plan image generating network by using a cross entropy loss function, a regression loss function, and a geometric loss function; and adjust parameters of the trained floor plan image generating network according to the loss value to obtain the floor plan image generating network.

In an embodiment of the present application, the aligning module 1207 is configured to align each room bounding box of the target building with the boundary of the target building, and align adjacent room bounding boxes of the target building.

Specific limitations on the floor plan image generating device may refer to the limitations on the floor plan image generating method above, and will not be described repeatedly hereinafter. Each module in the above floor plan image generating device may be implemented wholly or in part by software, hardware, and combinations thereof. The above modules may be embedded in or independent of the processor in the computer device in the form of hardware, or be stored in the memory in the computer device in the form of software, so that the processor may call and execute operations corresponding to the above modules.

Figure 14:
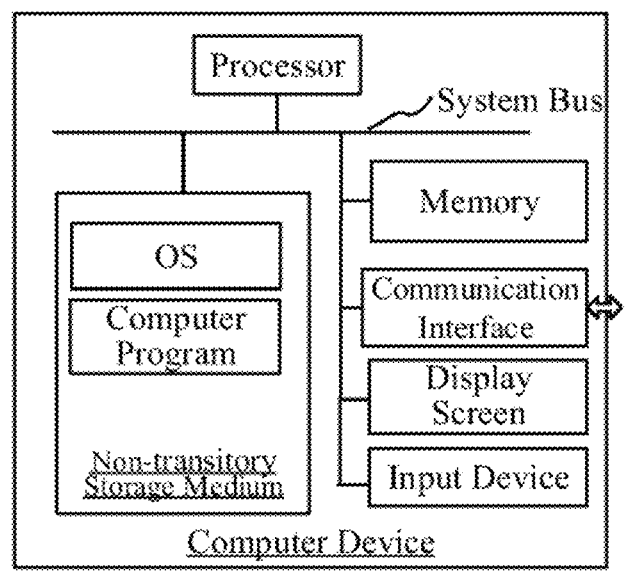
FIG. 14 is a view showing an internal structure of a computer device of an embodiment.

In an embodiment of the present application, a computer device is provided, the computer device may be a terminal, and an internal structure view thereof may be shown in FIG. 14. The computer device includes a processor, a memory, a communication interface, a display screen, and an input device that are connected by a system bus. The processor of the computer device is configured to provide computing and control capabilities. The memory of the computer device includes a non-transitory storage medium, a memory. The non-transitory storage medium stores an operating system and a computer program. The memory provides an environment for running the operating system and the computer program in the non-transitory storage medium. The communication interface of the computer device is configured for wired or wireless communication with an external terminal, and the wireless communication can be realized by WIFI, operator network, near field communication (NFC) or other technologies. The computer program, when executed by the processor, implements a floor plan image generating method. The display screen of the computer device may be a liquid crystal display screen or an electronic ink display screen. The input device of the computer device may be a touch layer covering the display screen, or a button, a trackball or a touchpad provided on a housing of the computer device, or an external keyboard, a trackpad, or a mouse.

Those skilled in the art should understand that the structure shown in FIG. 14 is only a block diagram of part of the structure related to the solutions of the present application, but not constitutes a limitation on the computer device, to which the solutions of the present application is applied. The specific computer device may include more or less parts than those shown in the figure, or combine some parts, or have a different arrangement of parts.

In an embodiment, a computer device is provided. The computer device includes a memory and a processor. A computer program is stored on the memory. The processor, when executing the computer program, performs the method of any one of the embodiments above.

In an embodiment, a non-transitory computer-readable storage medium is provided, and a computer program is stored on the non-transitory computer-readable storage medium. The computer program, when being executed by a processor, performs the method of any one of the embodiments above.

A person of ordinary skill in the art should understand that all or part of the processes in the method of the above embodiments may be implemented by means of a computer program instructing relevant hardware. The computer program may be stored in a non-volatile computer readable storage medium. When the computer program is executed, it may include the procedures of the embodiments of the above method. Where, any reference to the memory, the storage, the database or other medium used in the embodiments provided by the present application may include at least one of non-transitory memory and transitory memory. The non-transitory memory may include read-only memory (ROM), magnetic tape, floppy disk, flash memory, or optical memory. The transitory memory may include random access memory (RAM) or external cache memory. As an illustration but not a limitation, RAM can be in various forms, such as static random access memory (SRAM) or dynamic random access memory (DRAM), etc.

The technical features of the above embodiments may be combined arbitrarily. In order to make the description concise, not all possible combinations of the technical features of the above embodiments are described. However, as long as there is no contradiction in the combination of these technical features, any combination should be within the range described in this description.

The above examples are only several embodiments of the present application, and the descriptions thereof are more specific and detailed, but they should not be understood to be a limitation on the scope of the present invention. It should be noted that, for those of ordinary skill in the art, several modifications and improvements may be made without departing from the concept of the present application, and all these modifications and improvements fall within the protection scope of the present application. Therefore, the protection scope of the present application shall be subject to the appended claims.

What is claimed is:

1. A floor plan image generating method, comprising:
    acquiring a boundary of a target building and a layout constraint of the target building, the layout constraint comprising room types, room quantities, room locations, and adjacency relations between rooms;
    outputting multiple first floor plan images according to the layout constraint of the target building;
    selecting multiple second floor plan images from the multiple first floor plan images, and a matching degree between a boundary of each of the multiple second floor plan images and the boundary of the target building satisfying a preset condition;
    for each of the second floor plan images, applying a layout constraint of each of the second floor plan images to the boundary of the target building, and obtaining a layout of the target building corresponding to each of the multiple second floor plan images; and
    for each layout of the target building, inputting the layout of the target building and the boundary of the target building into a floor plan image generating network, and obtaining a predicted floor plan image of the target building outputted by the floor plan image generating network, wherein the predicted floor plan image comprises a room bounding box of each room in the target building and a positional relation of each room bounding box in the boundary of the target building.

2. The method according to claim 1, wherein the outputting the multiple first floor plan images according to the layout constraint of the target building comprises:
    retrieving the multiple first floor plan images that satisfy the layout constraint of the target building from a pre-stored floor plan image data set.

3. The method according to claim 2, wherein, before the retrieving the multiple first floor plan images that satisfy the layout constraint of the target building from the pre-stored floor plan image data set, the method further comprises:
- acquiring floor plan image data; and
- encoding the floor plan image data, and storing encoded floor plan image data in the floor plan image data set.

4. The method according to claim 3, wherein, the encoding the floor plan image data comprises encoding the room types, the room quantities, the room locations, and adjacency relations between rooms in the floor plan image.

5. The method according to claim 1, wherein the selecting the multiple second floor plan images from the multiple first floor plan images, comprises:
- obtaining turning functions of boundaries of the multiple first floor plan images and a turning function of the boundary of the target building;
- calculating an accumulated difference between each of the turning functions of the boundaries of the multiple first floor plan images and the turning function of the boundary of the target building; and
- using the multiple first floor plan images each corresponding to the accumulated difference smaller than a preset difference threshold as the multiple second floor plan images.

6. The method according to claim 5, wherein the accumulated difference is an area enclosed by a difference between each of the turning functions of the boundaries of the multiple first floor plan images and the turning function of the boundary of the target building, and a normalized accumulated boundary length axis of a coordinate system, and the coordinate system is formed by the normalized accumulated boundary length and an accumulated angle of each turning point in a two-dimensional polygon of the boundary.

7. The method according to claim 5, wherein the accumulated difference is zero.

8. The method according to claim 1, wherein, for each of the second floor plan images, applying the layout constraint of each of the second floor plan images to the boundary of the target building, and obtaining the layout of the target building corresponding to each of the second multiple floor plan images comprises:
- adjusting each of the multiple second floor plan images until an angle between a front door direction of each of the multiple second floor plan images and a front door direction of the target building is smaller than a preset angle threshold, and obtaining adjusted second floor plan images; and
- for each of the adjusted second floor plan images, applying room types, room quantities, room locations, and adjacency relations between rooms of each of the adjusted second floor plan images to the boundary of the target building, and obtaining the layout of the target building corresponding to each of the multiple second floor plan images.

9. The method according to claim 8, wherein, after the for each of the second floor plan images, applying the layout constraint of each of the second floor plan images to the boundary of the target building, and obtaining the layout of the target building corresponding to each of the second multiple floor plan images, the method further comprises adjusting a node outside the boundary, and the adjusting the node outside the boundary comprises:
- establishing a bounding box of the target building and grids in the bounding box;
- searching a grid where the node outside the boundary is located; and
- moving the node outside the boundary into a nearest grid within the boundary.

10. The method according to claim 9, wherein, the moving the node outside the boundary into the nearest grid within the boundary comprises:
- if there has been a node already in the nearest grid within the boundary, moving the node in the grid to a new grid in the same direction; and
- if a node is moved in the same direction to the last grid within the boundary, and there still has been another node in the last grid, keeping two nodes in the last grid, wherein the same direction refers to the same direction along which the node outside the boundary is moved into the nearest grid within the boundary.

11. The method according to claim 1, wherein, the for each layout of the target building, inputting the layout of the target building and the boundary of the target building into the floor plan image generating network, and obtaining the predicted floor plan image of the target building outputted by the floor plan image generating network, comprise:
- for each layout of the target building, inputting the layout of the target building into an image neural network, and obtaining a room feature vector corresponding to each room in the layout of the target building;
- inputting the boundary of the target building into a first convolutional neural network (CNN), and obtaining a boundary feature vector of the target building;
- correlating the room feature vector corresponding to each room with the boundary feature vector to obtain a correlated feature vector corresponding to each room;
- inputting the correlated feature vector corresponding to each room into a first multilayer perceptron (MLP), and obtaining an initial bounding box corresponding to each room in the layout of the target building;
- mapping the correlated feature vector corresponding to each room by using the initial bounding box corresponding to each room to obtain a first feature image corresponding to each room;
- combining multiple first feature images of multiple rooms to obtain a second feature image, and inputting the second feature image into a second CNN to obtain a grid floor plan image of the target building; and
- inputting multiple correlated feature vectors of the multiple rooms, multiple initial bounding boxes of the multiple rooms and the grid floor plan image into a bounding box optimizing network to obtain the predicted floor plan image of the target building, and the bounding box optimizing network comprising a third CNN, a pooled layer of a region of interest, and a second MLP.

12. The method according to claim 11, wherein, the inputting the multiple correlated feature vectors of the multiple rooms, the multiple initial bounding boxes of the multiple rooms and the grid floor plan image into the bounding box optimizing network to obtain the predicted floor plan image of the target building comprises:
- processing, by the third CNN, the grid floor plan image to obtain a third feature image;
- inputting each of the multiple initial bounding boxes of the multiple rooms and the third feature image into a pooled layer of a region of interest to obtain a feature vector with a specific length corresponding to each room;
- merging and inputting the feature vector with the specific length corresponding to each room and each of the multiple correlated feature vectors of the multiple rooms into the second MLP to obtain an optimized bounding box corresponding to each room; and predicting a visual position relationship of the room bounding box of each room within the boundary of the target building according to the optimized bounding box corresponding to each room.

13. The method of claim 1, further comprising:

obtaining a training data set, and the training data set comprising multiple floor plan image data;

training an initial floor plan image generating network by using the training data set to obtain trained floor plan image generating network;

calculating a loss value of the trained floor plan image generating network by using a cross entropy loss function, a regression loss function, and a geometric loss function; and adjusting parameters of the trained floor plan image generating network according to the loss value to obtain the floor plan image generating network.

14. The method of claim 1, further comprising:

aligning each room bounding box of the target building with the boundary of the target building; and aligning adjacent room bounding boxes of the target building.

15. The method of claim 1, wherein the acquiring the boundary of the target building and the layout constraint of the target building comprises:

measuring the target building to obtain the boundary of the target building; and obtaining inputted layout constraint of the target building.

16. The method according to claim 1, wherein the selecting the multiple second floor plan images from the multiple first floor plan images, comprises:

overlapping and comparing an area enclosed by a boundary of the first floor plan image and an area enclosed by the boundary of the target building;

calculating a ratio of an area of an overlap region to the area enclosed by the boundary of the target building; and selecting the first floor plan image to be the second floor plan image if the ratio exceeds a preset area threshold.

17. The method according to claim 1, wherein the selecting the multiple second floor plan images from the multiple first floor plan images, comprises:

calculating a perimeter of a boundary and the number of corners of each of the multiple first floor plan images and a perimeter of the boundary and the number of corners of the target building;

selecting a first floor plan image to be the second floor plan image, if a difference between the perimeter of the boundary of each of the multiple first floor plan images and the perimeter of the boundary of the target building is less than a preset perimeter difference threshold, and if a difference between the number of corners of each of the multiple first floor plan images and the number of corners of the target building is less than a preset number difference threshold.

18. A computer device, comprising a memory and a processor, wherein the memory stores computer programs, and the processor, when executing the computer programs, performs steps of the method of claim 1.

19. A non-transitory computer-readable storage medium, on which computer programs are stored, wherein, the computer programs, when being executed by a processor, perform steps of the method of claim 1.

20. A floor plan image generating device, comprising a processor and a memory, the memory having computer programs stored therein, and the computer programs, when being executed by the processor, causes the processor to perform:

acquiring a boundary of a target building and a layout constraint of the target building, the layout constraint comprising room types, room quantities, room locations, and adjacency relations between rooms;

outputting multiple first floor plan images according to the layout constraint of the target building;

selecting multiple second floor plan images from the multiple first floor plan images, and a matching degree between a boundary of each of the multiple second floor plan images and the boundary of the target building satisfying a preset condition;

for each of the second floor plan images, applying a layout constraint of each of the second floor plan images to the boundary of the target building, and obtaining a layout of the target building corresponding to each of the multiple second floor plan images; and for each layout of the target building, inputting the layout of the target building and the boundary of the target building into a floor plan image generating network, and obtaining a predicted floor plan image of the target building outputted by the floor plan image generating network, wherein the predicted floor plan image comprises a room bounding box of each room in the target building and a positional relation of each room bounding box in the boundary of the target building.

* * * * *